US011664043B2

(12) United States Patent
Lyu et al.

(10) Patent No.: US 11,664,043 B2
(45) Date of Patent: May 30, 2023

(54) REAL-TIME VERBAL HARASSMENT DETECTION SYSTEM

(71) Applicant: Beijing DiDi Infinity Technology and Development Co., Ltd., Beijing (CN)

(72) Inventors: Ying Lyu, Santa Clara, CA (US); Kun Han, Sunnyvale, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 174 days.

(21) Appl. No.: 17/134,912

(22) Filed: Dec. 28, 2020

(65) Prior Publication Data

US 2021/0201934 A1    Jul. 1, 2021

Related U.S. Application Data

(60) Provisional application No. 62/955,963, filed on Dec. 31, 2019.

(51) Int. Cl.
*G10L 25/00* (2013.01)
*G10L 25/63* (2013.01)
(Continued)

(52) U.S. Cl.
CPC .......... *G10L 25/63* (2013.01); *B60R 11/0247* (2013.01); *G06N 20/00* (2019.01); *G10L 15/26* (2013.01); *G10L 25/27* (2013.01)

(58) Field of Classification Search
CPC ............................ B60R 11/0247; G06N 7/005
See application file for complete search history.

(56) References Cited

U.S. PATENT DOCUMENTS 9,703,872 B2   7/2017 Spears
10,222,942 B1  3/2019 Zeiler et al.
(Continued)

FOREIGN PATENT DOCUMENTS

CN    109256150 A  *  1/2019   ............ G10L 17/00
CN    110309293 A      10/2019
(Continued)

OTHER PUBLICATIONS

Balci, K., & Salah, A. A. (2015). Automatic analysis and identification of verbal aggression and abusive behaviors for online social games. Computers in Human Behavior, 53, 517-526. https://doi.org/10.1016/j.chb.2014.10.025 (Year: 2015).*

(Continued)

*Primary Examiner* — Huyen X Vo
*Assistant Examiner* — Philip H Lam
(74) *Attorney, Agent, or Firm* — Knobbe, Martens, Olson & Bear, LLP

(57) ABSTRACT

In some cases, a verbal harassment detection system may use machine learning models to detect verbal harassment in real-time or near real-time. The system may receive an audio segment comprising a portion of audio captured by a microphone located within a vehicle. Further, the system may convert the audio segment to a text segment. The system may provide at least the text segment to a prediction model associated with verbal harassment detection to obtain a harassment prediction. Further, the system may provide the audio segment to an emotion detector to obtain a detected emotion of a speaking user that made an utterance included in the audio segment. Based at least in part on the harassment prediction and the detected emotion, the system may automatically, and without user intervention, determine whether a user is being harassed.

20 Claims, 10 Drawing Sheets

(51) Int. Cl.
  *G10L 25/27* (2013.01)
  *B60R 11/02* (2006.01)
  *G06N 20/00* (2019.01)
  *G10L 15/26* (2006.01)

(56) References Cited

U.S. PATENT DOCUMENTS

| | | | |
|---|---|---|---|
| 10,453,453 B2 * | 10/2019 | Penilla | G10L 15/22 |
| 10,460,600 B2 | 10/2019 | Julian et al. | |
| 10,592,757 B2 | 3/2020 | el Kaliouby et al. | |
| 11,170,064 B2 | 11/2021 | David | |
| 11,195,542 B2 | 12/2021 | Zass | |
| 11,330,009 B2 | 5/2022 | Liu et al. | |
| 11,354,900 B1 | 6/2022 | Li et al. | |
| 11,409,963 B1 * | 8/2022 | Nagula | G06F 40/30 |
| 2002/0099730 A1 | 7/2002 | Brown et al. | |
| 2015/0309987 A1 | 10/2015 | Epstein et al. | |
| 2015/0310352 A1 | 10/2015 | Kyaw | |
| 2018/0001899 A1 | 1/2018 | Shenoy et al. | |
| 2018/0232511 A1 * | 8/2018 | Bakish | G06F 21/32 |
| 2020/0125639 A1 | 4/2020 | Doyle | |
| 2020/0159601 A1 * | 5/2020 | Asmussen | G06F 11/076 |
| 2020/0349666 A1 * | 11/2020 | Hodge | G08G 1/017 |
| 2021/0086778 A1 * | 3/2021 | Suthar | B60W 40/08 |
| 2021/0191398 A1 | 6/2021 | Chen et al. | |
| 2021/0201891 A1 | 7/2021 | Lyu et al. | |
| 2021/0201892 A1 | 7/2021 | Lyu et al. | |
| 2021/0201893 A1 | 7/2021 | Lyu et al. | |

FOREIGN PATENT DOCUMENTS

| | | |
|---|---|---|
| DE | 10311587 A1 | 9/2004 |
| JP | 2019-095552 | 6/2019 |
| KR | 10-2011-0010179 | 2/2011 |
| KR | 10-2017-0058885 | 5/2017 |
| KR | 10-2019-0100669 | 8/2019 |
| WO | WO 2017/130122 | 8/2017 |
| WO | WO 2021/138316 | 7/2021 |
| WO | WO 2021/138319 | 7/2021 |
| WO | WO 2021/138320 | 7/2021 |
| WO | WO 2021/138341 | 7/2021 |

OTHER PUBLICATIONS

L. Liu, X. Zhang, M. Qiao and W. Shi, "SafeShareRide: Edge-Based Attack Detection in Ridesharing Services," 2018 IEEE/ACM Symposium on Edge Computing (SEC), 2018, pp. 17-29, doi: 10.1109/SEC.2018.00009. (Year: 2018).*

Balci et al., "Automatic Analysis and Identification of Verbal Aggression and Abusive Behaviors for Online Social Games", Dec. 31, 2015, retrieved from <https://reader.elsevier.com/reader/sd/pii/S0747563214005482> on Apr. 1, 2021, pp. 517-526.

Chan et al., "Listen, Attend and Spell: A Neural Network for Large Vocabulary Conversational Speech Recognition", 2016 IEEE International Conference on Acoustics, Speech and Signal Processing (ICASSP), 2016, pp. 4960-4964.

Chorowski et al., "Attention-Based Models for Speech Recognition" NIPS, 2015, in 9 pages.

Craven et al., "Constructing biological knowledge bases by extracting information from text sources", ISMB, vol. 1999, pp. 77-86. 1999.

Dalvi et al., "Aggregating crowdsourced binary ratings", Proceedings of the 22nd international conference on World Wide Web, ACM, 2013, pp. 285-294.

Devlin et al., "BERT: Pre-training of Deep Bidirectional Transformers for Language Understanding", arXiv preprint arXiv:1810.04805, 2018, in 14 pages.

FastText, retrieved from <https://fasttext.cc/> on Dec. 23, 2020 in 4 pages.

Graves et al., "Connectionist Temporal Classification: Labelling Unsegmented Sequence Data with Recurrent Neural Networks",ICML 2006—Proceedings of the 23rd International Conference on Machine Learning, 2006, pp. 369-376.

Gunasekara et al., "A Review of Standard Text Classification Practices for Multi-label Toxicity Identification of Online Content", Oct. 31, 2018, retrieved from <https://www.aclweb.org/anthology/W18-5103.pdf> on Apr. 2, 2021, pp. 21-25.

Han et al., "Speech Emotion Recognition Using Deep Neural Network and Extreme Learning Machine", Interspeech 2014, pp. 223-227.

Hinton et al., "Deep Neural Networks for Acoustic Modeling in Speech Recognition", IEEE Signal Processing Magazine, Nov. 2012, pp. 82-97.

Howard et al., "Universal language model fine-tuning for text classification", arXiv preprint arXiv:1801.06146 (2018).

International Search Report and Written Opinion in International Application No. PCT/US2020/067303, dated Apr. 16, 2021 in 7 pages.

International Search Report and Written Opinion in International Application No. PCT/US2020/067308, dated Apr. 16, 2021 in 8 pages.

International Search Report and Written Opinion in International Application No. PCT/US2020/067309, dated Apr. 19, 2021 in 7 pages.

International Search Report and Written Opinion in International Application No. PCT/US2020/067336, dated Apr. 7, 2021 in 11 pages.

Joglekar et al., "Comprehensive and reliable crowd assessment algorithms", 2015 IEEE 31st International Conference on Data Engineering, IEEE, 2015, pp. 195-206.

Kim, "Convolutional neural networks for sentence classification", arXiv preprint arXiv:1408.5882 (2014).

Lai et al., "Recurrent convolutional neural networks for text classification", Twenty-ninth AAAI conference on artificial intelligence, 2015.

Mikolov et al., "Distributed Representations of Words and Phrases and their Compositionality", Advances in Neural Information Processing Systems, 2013, pp. 1-9.

Mintz et al., "Distant supervision for relation extraction without labeled data", Proceedings of the Joint Conference of the 47th Annual Meeting of the ACL and the 4th International Joint Conference on Natural Language Processing of the AFNLP: vol. 2-vol. 2, Association for Computational Linguistics, 2009, pp. 1003-1011.

Pan et al., "Speech Emotion Recognition Using Support Vector Machine", International Journal of Smart Home, vol. 6, No. 2, Apr. 2012, pp. 101-108.

Pan et al., "A Survey on Transfer Learning" IEEE Transactions on Knowledge and Data Engineering 22 (10). IEEE, 2010, pp. 1345-1359.

Peters et al., "Deep contextualized word representations" arXiv preprint arXiv:1802.05365 (2018) in 15 pages.

Rabiner, "A Tutorial on Hidden Markov Models and Selected Applications in Speech Recognition", Proceedings of the IEEE, vol. 77, No. 2, Feb. 1989, pp. 257-286.

Ratner et al., "Data programming: Creating large training sets, quickly", Advances in neural information processing systems, 2016, pp. 3567-3575.

Ratner et al., "Snorkel: Rapid training data creation with weak supervision", Proceedings of the VLDB Endowment 11, No. 3, 2017, pp. 269-282.

Schuller et al., "Hidden Markov Model-based Speech Emotion Recognition", 2003 IEEE International Conference on Acoustics, Speech, and Signal Processing (ICASSP), 2003, pp. II:1-II:4.

Trigeorgis et al., "Adieu Features? End-to-end Speech Emotion Recognition using a Deep Convolutional Recurrent Network",2016 IEEE International Conference on Acoustics, Speech and Signal Pprocessing (ICASSP), 2016, pp. 5200-5204.

Varma et al., "Inferring generative model structure with static analysis", Advances in neural information processing systems, 2017, pp. 240-250.

Varma et al., "Snuba: automating weak supervision to label training data", Proceedings of the VLDB Endowment 12, No. 3, 2018, pp. 223-236.

(56) References Cited

OTHER PUBLICATIONS

Yang et al., "Hierarchical Attention Networks for Document Classification", Proceedings of North American Chapter of the Association for Computational Linguistics: Human Language Technologies, Jun. 2016, pp. 1480-1489.

Zhang et al., "Character-level Convolutional Networks for Text Classification*" (2015) in 9 pages.

Zhang et al., "Spectral methods meet EM: A provably optimal algorithm for crowdsourcing", Advances in neural information processing systems, 2014, pp. 1260-1268.

* cited by examiner

|  | ORDERS test:valid:train = 2556:1000:8998 | | | SEGMENTS test:valid:train = 12092:4502:41800 | | |
| --- | --- | --- | --- | --- | --- | --- |
|  | POSITIVES | NEGATIVES | L4 | POSITIVES | NEGATIVES | L4 |
| TRAIN | 1477 | 7521 | 492 | 10799 | 30730 | 3508 |
| VALID | 166 | 834 | 58 | 1211 | 3290 | 392 |
| TEST | 468 | 2088 | 192 | 3614 | 8478 | 1390 |

FIG.6

|    | total_examples | threshold | predict_positives | recall@conflict |
|----|---------------|-----------|-------------------|-----------------|
| 0  | 192.0 | 0.70 | 170.0 | 0.885 |
| 1  | 192.0 | 0.71 | 169.0 | 0.880 |
| 2  | 192.0 | 0.72 | 168.0 | 0.875 |
| 3  | 192.0 | 0.73 | 168.0 | 0.875 |
| 4  | 192.0 | 0.74 | 168.0 | 0.875 |
| 5  | 192.0 | 0.75 | 167.0 | 0.870 |
| 6  | 192.0 | 0.76 | 166.0 | 0.865 |
| 7  | 192.0 | 0.77 | 164.0 | 0.854 |
| 8  | 192.0 | 0.78 | 163.0 | 0.849 |
| 9  | 192.0 | 0.79 | 160.0 | 0.833 |
| 10 | 192.0 | 0.80 | 158.0 | 0.823 |
| 11 | 192.0 | 0.81 | 157.0 | 0.818 |
| 12 | 192.0 | 0.82 | 155.0 | 0.807 |
| 13 | 192.0 | 0.83 | 155.0 | 0.807 |
| 14 | 192.0 | 0.84 | 154.0 | 0.802 |
| 15 | 192.0 | 0.85 | 153.0 | 0.797 |
| 16 | 192.0 | 0.86 | 152.0 | 0.792 |
| 17 | 192.0 | 0.87 | 152.0 | 0.792 |
| 18 | 192.0 | 0.88 | 150.0 | 0.781 |
| 19 | 192.0 | 0.89 | 148.0 | 0.771 |
| 20 | 192.0 | 0.90 | 147.0 | 0.766 |
| 21 | 192.0 | 0.91 | 142.0 | 0.740 |
| 22 | 192.0 | 0.92 | 138.0 | 0.719 |
| 23 | 192.0 | 0.93 | 137.0 | 0.714 |
| 24 | 192.0 | 0.94 | 134.0 | 0.698 |
| 25 | 192.0 | 0.95 | 126.0 | 0.656 |
| 26 | 192.0 | 0.96 | 123.0 | 0.641 |
| 27 | 192.0 | 0.97 | 109.0 | 0.568 |
| 28 | 192.0 | 0.98 | 96.0  | 0.500 |
| 29 | 192.0 | 0.99 | 79.0  | 0.411 |
| 30 | 192.0 | 1.00 | 0.0   | 0.000 |

FIG.8

|    | total_examples | threshold | predict_positives | recall@conflict |
|----|----------------|-----------|-------------------|-----------------|
| 0  | 99986.0        | 0.70      | 10547.0           | 0.105           |
| 1  | 99986.0        | 0.71      | 10183.0           | 0.102           |
| 2  | 99986.0        | 0.72      | 9810.0            | 0.098           |
| 3  | 99986.0        | 0.73      | 9432.0            | 0.094           |
| 4  | 99986.0        | 0.74      | 9061.0            | 0.091           |
| 5  | 99986.0        | 0.75      | 8719.0            | 0.087           |
| 6  | 99986.0        | 0.76      | 8363.0            | 0.084           |
| 7  | 99986.0        | 0.77      | 8025.0            | 0.080           |
| 8  | 99986.0        | 0.78      | 7685.0            | 0.077           |
| 9  | 99986.0        | 0.79      | 7331.0            | 0.073           |
| 10 | 99986.0        | 0.80      | 7030.0            | 0.070           |
| 11 | 99986.0        | 0.81      | 6700.0            | 0.067           |
| 12 | 99986.0        | 0.82      | 6375.0            | 0.064           |
| 13 | 99986.0        | 0.83      | 6058.0            | 0.061           |
| 14 | 99986.0        | 0.84      | 5749.0            | 0.057           |
| 15 | 99986.0        | 0.85      | 5401.0            | 0.054           |
| 16 | 99986.0        | 0.86      | 5095.0            | 0.051           |
| 17 | 99986.0        | 0.87      | 4796.0            | 0.048           |
| 18 | 99986.0        | 0.88      | 4496.0            | 0.045           |
| 19 | 99986.0        | 0.89      | 4153.0            | 0.042           |
| 20 | 99986.0        | 0.90      | 3816.0            | 0.038           |
| 21 | 99986.0        | 0.91      | 3481.0            | 0.035           |
| 22 | 99986.0        | 0.92      | 3157.0            | 0.032           |
| 23 | 99986.0        | 0.93      | 2829.0            | 0.028           |
| 24 | 99986.0        | 0.94      | 2478.0            | 0.025           |
| 25 | 99986.0        | 0.95      | 2106.0            | 0.021           |
| 26 | 99986.0        | 0.96      | 1740.0            | 0.017           |
| 27 | 99986.0        | 0.97      | 1360.0            | 0.014           |
| 28 | 99986.0        | 0.98      | 945.0             | 0.009           |
| 29 | 99986.0        | 0.99      | 481.0             | 0.005           |
| 30 | 99986.0        | 1.00      | 0.0               | 0.000           |

FIG.9

REAL-TIME VERBAL HARASSMENT DETECTION SYSTEM

INCORPORATION BY REFERENCE TO ANY PRIORITY APPLICATIONS

This application claims priority to U.S. Provisional Application No. 62/955,963, which was filed on Dec. 31, 2019 and is titled "REAL-TIME VERBAL HARASSMENT DETECTION SYSTEM," the disclosure of which is expressly incorporated by reference herein in its entirety for all purposes. Further, this application is being filed on Dec. 28, 2020, the same date as U.S. application Ser. No. 17/135,015, which is titled "GENERATION OF TRAINING DATA FOR VERBAL HARASSMENT DETECTION" and is hereby expressly incorporated by reference herein in its entirety for all purposes, and the same date as U.S. application Ser. No. 17/135,651, which is titled "TRAINING MECHANISM OF VERBAL HARASSMENT DETECTION SYSTEMS" and is hereby expressly incorporated by reference herein in its entirety for all purposes and is made part of this application (these two applications may collectively be referred to as the "Training Applications" herein). Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like.

In some instances, a user of ride-sharing services may be mistreated by another user, such as a fellow rider or a driver. For example, a user may be verbally harassed, improperly propositioned, threatened, robbed, or treated in other illegal or undesirable ways. Reports submitted by victims or other users of improper behavior by drivers or fellow passengers can help identify users that behaved illegally or inappropriately enabling disciplinary action to be performed. However, in some circumstances, the awaiting a report to be submitted by a victim is insufficient. For example, in some cases, the delay in receiving the report may prevent or reduce the effectiveness of countermeasures that may be performed. Further, in some cases, a victim may not report an occurrence of harassment or other inappropriate or illegal behaviors.

SUMMARY

In certain aspects, a computer-implemented method may determine or predict whether a user is being harassed. The method may be implemented by an interactive computing system comprising one or more hardware processors that are configured with or to perform specific computer-executable instructions. The method may include: receiving an audio segment comprising a portion of audio captured by a microphone located within a vehicle; converting the audio segment to a text segment; accessing a prediction model associated with verbal harassment detection; providing at least the text segment to the prediction model to obtain a harassment prediction; providing the audio segment to an emotion detector to obtain a detected emotion of a speaking user that made an utterance included in the audio segment; and determining based at least in part on the harassment prediction and the detected emotion that a user is being harassed.

The method of the preceding paragraph can include any combination or sub-combination of the following features: where the prediction model comprises at least one of a hierarchical attention network model, a fastText model, or a convolutional neural network model; where the emotion detector implements one or more of a hidden Markov model, a support vector machine, a deep feed-forward model, a recurrent neural network, or a convolutional neural network; where the method further comprises initiating an intervention process upon determining that the user is being harassed; where initiating the intervention process comprises one or more of: alerting an authority; alerting an administrator of a ride-sharing application; causing an alert to be displayed on a wireless device located within the vehicle; or blocking a driver user from accepting an order on the ride-sharing application; where the microphone is included on a wireless device executing a ride-sharing application; where the audio segment comprises a filtered audio segment that is filtered to remove audio not generated by occupants of the vehicle; where the filtered audio segment is filtered to remove one or more of navigation audio, radio audio, ambient sounds from outside the vehicle, or ambient sounds generated by the vehicle during operation; where the method further comprises generating the prediction model that determines a likelihood of harassment of a first user by a second user, wherein generating the prediction model comprises: accessing a set of training data comprising text generated from a set of audio segments, wherein at least some of the set of training data includes verbal harassment and at least some of the set of training data does not include verbal harassment; accessing a set of harassment labels associated with the set of training data, the set of harassment labels identifying an existence of or a type of harassment associated with each training data item; and using a machine learning algorithm to generate the prediction model based at least in part on the set of training data and the set of harassment labels; where the set of training data comprises historical audio segments obtained during prior orders generated on a ride-sharing application; where the method further comprises generating a vector representation of the text segment, wherein providing the text segment to the prediction model comprises providing the vector representation of the text segment to the prediction model; where determining that the user is being harassed comprises determining that at least one of a harassment prediction probability satisfies a first harassment probability threshold or a measure of the detected emotion exceeds a second harassment probability threshold; where determining that the user is being harassed comprises determining that an aggregation of a harassment prediction probability and a measure of the detected emotion exceeds a third harassment probability threshold; and where converting the audio segment to the text segment comprises applying the audio segment to a hidden Markov model or a deep learning model.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 6 presents a table of sample data applied to an embodiment of the safety incidence detection system.

FIG. 8 presents experimental results for case recalls at different thresholds using the sample data of FIG. 6 an embodiment of the safety incidence detection system.

FIG. 9 presents experimental results for order-level influence rates at different thresholds using the sample data of FIG. 6 as applied to an embodiment of the safety incidence detection system.

DETAILED DESCRIPTION

Figure 1A:
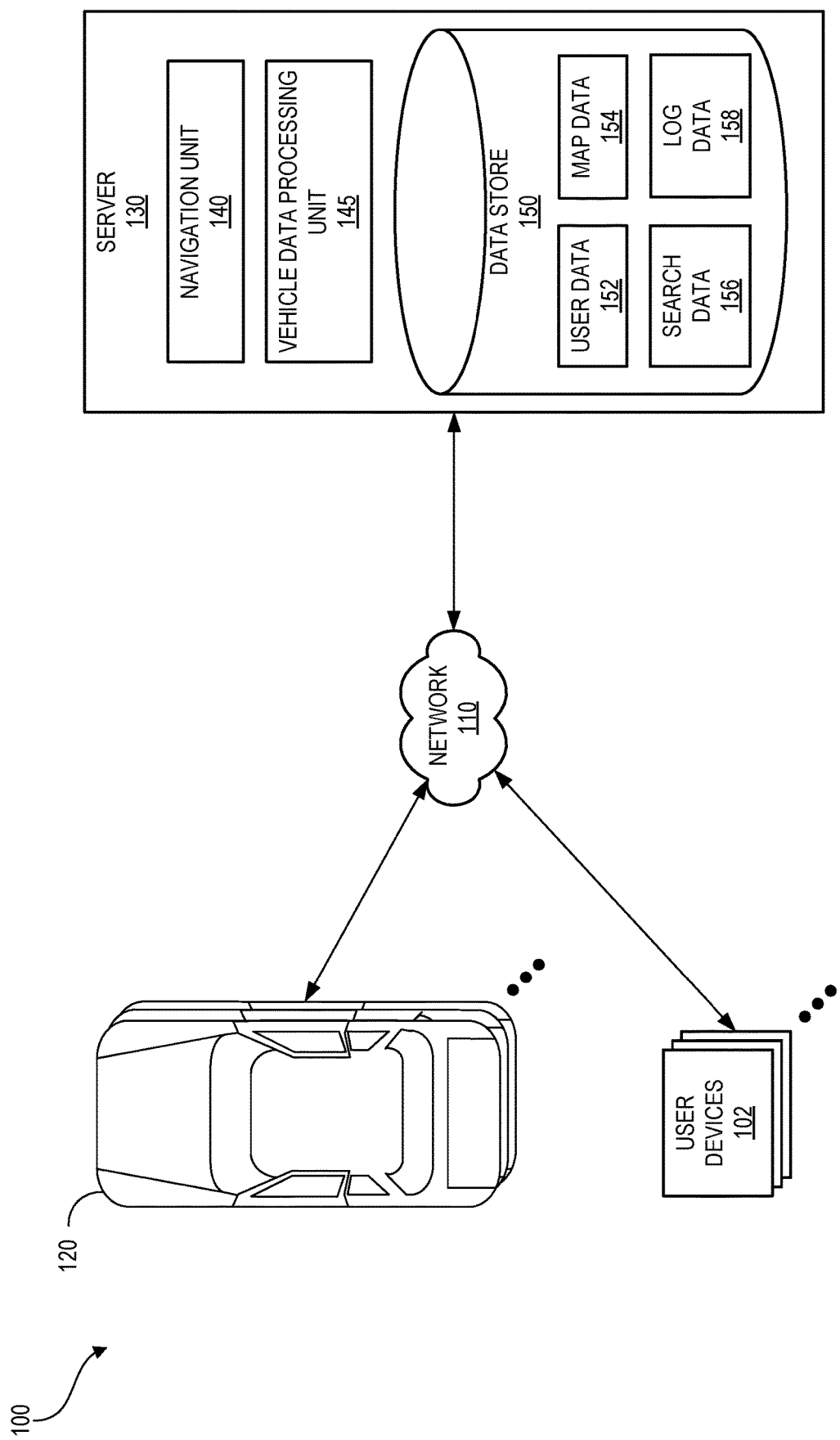
FIG. 1A illustrates a block diagram of a networked vehicle environment in which one or more vehicles and/or one or more user devices interact with a server via a network, according to certain aspects of the present disclosure.

As previously described, relying on users to report harassment, such as sexual harassment, that may occur during a ride-sharing trip can be ineffective. For example, the reporting of harassment may be delayed as reporting typically happens after the harassment or the ride has completed. Often times the reporting may be significantly delayed as it takes some victims time to reach a mental state where they are capable of reporting the harassment. Some users never reach a state where they feel comfortable enough to report harassment and thus, some instances of harassment are never reported. Accordingly, it is desirable to have a system that can identify verbal harassment or other illicit behavior in real-time or near real-time.

One solution to the problem of delayed or non-reported harassment is to record audio using a wireless device, such as the wireless device executing the ride-sharing application, and compare the audio to patterns to detect whether the audio includes speech associated with harassment. Although useful in some cases, this solution may have some drawbacks in some instances. For example, the performance of the pattern matching is sometimes poor due to noisy data. For example, sometimes the captured audio has ambient noise that makes pattern matching difficult. Further, it can be challenging and time-consuming to create the patterns to which the audio data is matched.

Certain aspects disclosed herein improve on harassment detection without the aforementioned drawbacks by applying machine-learning techniques to identify harassment in real-time, or near real-time (e.g., within seconds or less of receiving audio data). For example, neural network models may be applied to predict the likelihood that audio segments captured from users in a vehicle include harassment. In some cases, emotion detection may be combined with text analysis to determine the probability that an audio segment includes verbal harassment. Although much of the description herein relates to determining whether a driver of a ride-sharing vehicle is harassing a passenger of the ride-sharing vehicle, it should be understood that aspects of the present disclosure is not limited as such and that the teachings here can be used to determine whether a passenger is harassing a driver, a fellow passenger, or another user.

Detailed descriptions and examples of systems and methods according to one or more illustrative embodiments of the present disclosure may be found, at least, in the section entitled Verbal Harassment Detection System, as well as in the section entitled Example Embodiments, and also in FIGS. 2-9 herein. Furthermore, components and functionality for a verbal harassment system may be configured and/or incorporated into the networked vehicle environment 100 described herein in FIGS. 1A-1B.

Various embodiments described herein are intimately tied to, enabled by, and would not exist except for, vehicle and/or computer technology. For example, real-time machine learning based verbal harassment detection described herein in reference to various embodiments cannot reasonably be performed by humans alone, without the vehicle and/or computer technology upon which they are implemented.

Networked Vehicle Environment

FIG. 1A illustrates a block diagram of a networked vehicle environment 100 in which one or more vehicles 120 and/or one or more user devices 102 interact with a server 130 via a network 110, according to one embodiment. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. A user device 102 can execute an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. The server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. The network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
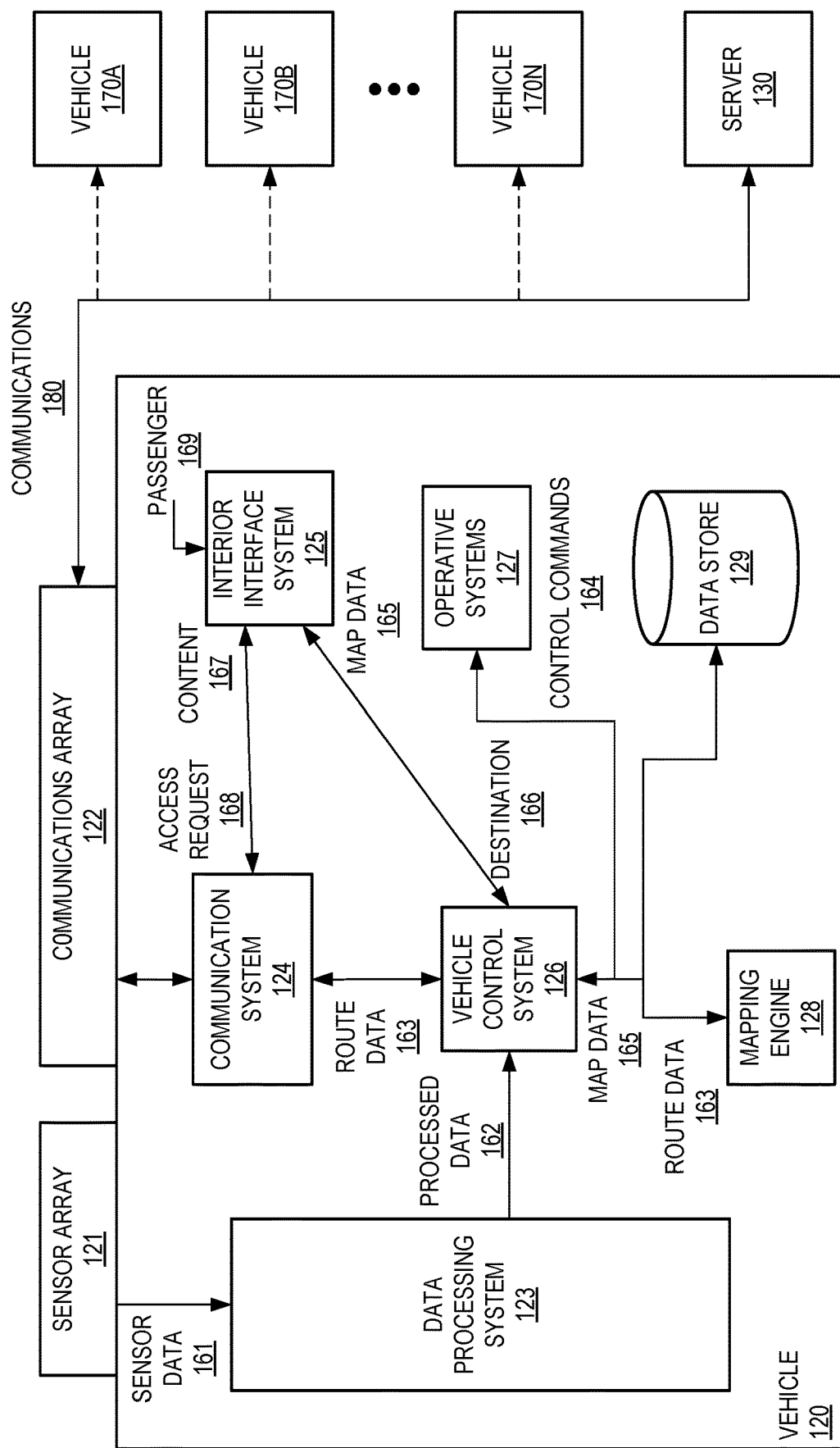
FIG. 1B illustrates a block diagram showing the vehicle of FIG. 1A in communication with one or more other vehicles and/or the server of FIG. 1A, according to certain aspects of the present disclosure.

FIG. 1B illustrates a block diagram showing the vehicle 120 of FIG. 1A in communication with one or more other vehicles 170A-N and/or the server 130 of FIG. 1A, according to one embodiment. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. The vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). The vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Verbal Harassment Detection System

As described above, it is desirable to detect harassment in real-time or near real-time (e.g., within seconds or minutes, or before the completion of a ride-sharing event) so that the harassment can be stopped and/or appropriate action (e.g., contacting the police or other authorities) can be taken, and in particular verbal harassment. Aspects of the present disclosure perform harassment detection, and more specifically verbal harassment detection, using machine learning models that may be generated using historical data. In some aspects, non-verbal harassment may be detected using audio data. For example, physical harassment may be detected based on speech and/or sounds associated with an occurrence of physical harassment.

The machine learning models may include prediction models that are generated using one or more machine learning algorithms. The prediction models (sometimes referred to as "parameter functions" or "prediction functions") may output a prediction of whether certain audio includes or indicates an occurrence of harassment. Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

Example Networked Computing Environment with Harassment Detection

Figure 2:
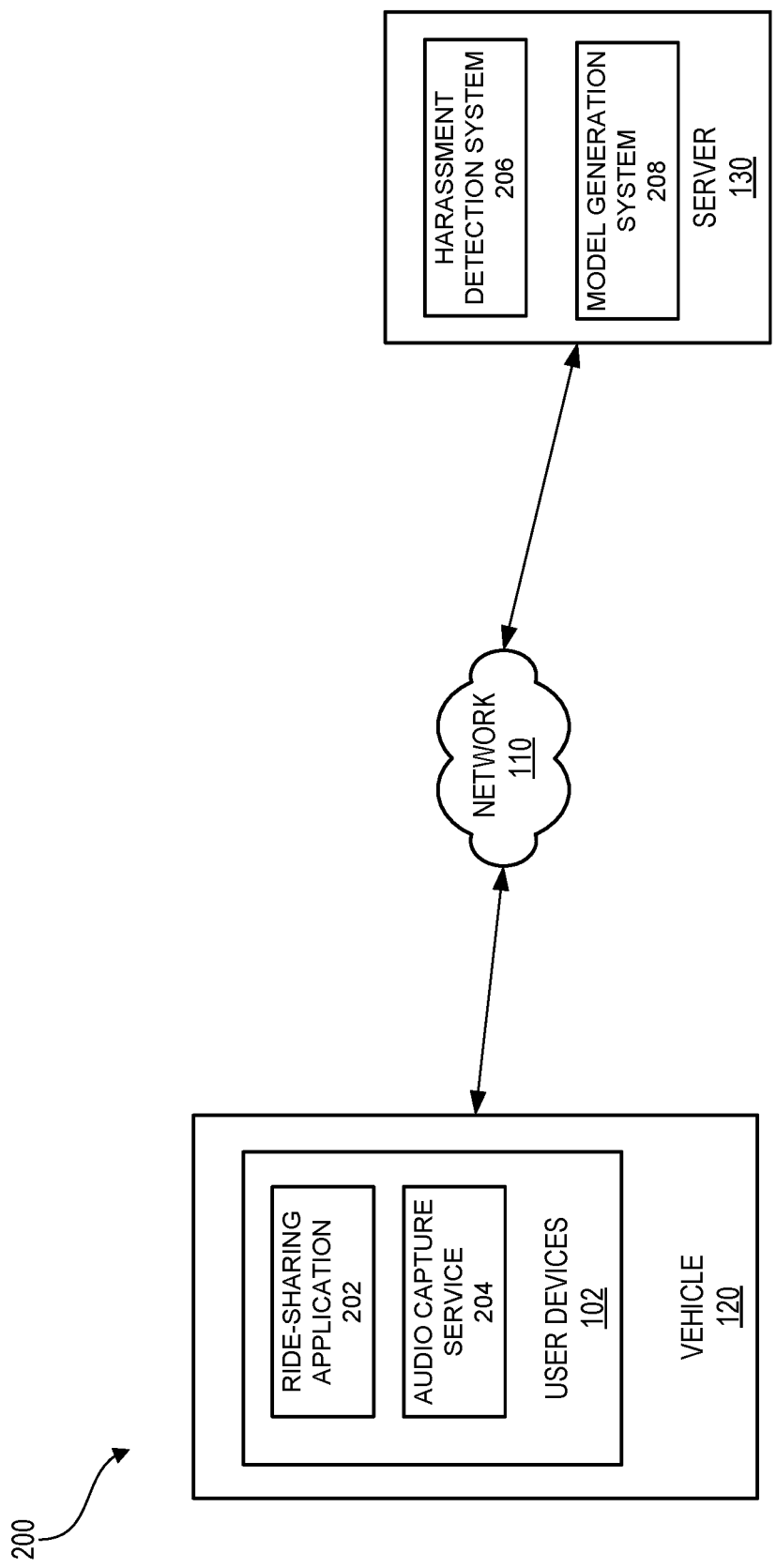
FIG. 2 illustrates a block diagram showing additional and/or alternative details of the networked vehicle environment of FIG. 1A in accordance with certain aspects of the present disclosure.

FIG. 2 illustrates a block diagram showing additional and/or alternative details of the networked vehicle environment of FIG. 1A in accordance with certain aspects of the present disclosure. The networked vehicle environment 200 may include one or more of the embodiments previously described with respect to the networked vehicle environment 100.

The networked vehicle environment 200 may include a vehicle 120. The vehicle 120 may include one or more user devices 102. These user devices 102 may be separate devices from the vehicle 120 that are brought into the vehicle by one or more users. For example, the user devices 102 may include cell phones (e.g., smart phones), tablets, laptops, or other devices that can execute a ride-sharing application and/or communicate over a network 110 with a server 130. Although typically independent of the vehicle 120, in some cases, the user devices 102 may interface with the vehicle 120. For example, a user device 102 may communicate map information or directions to a display in or integrated with the vehicle 120. In some cases, the user device 102 may be part of the vehicle 120.

At least some of the user devices 102 may have, may host, and/or may execute a ride-sharing application 202. The ride-sharing application 202 may include any application that enables a user to request a ride from an autonomous vehicle, a semi-autonomous vehicle (e.g., vehicles that provide driver-assist functionality), and/or another user that is participating in a ride-sharing service as a driver and/or that has a user device 102 with the ride-sharing application 202.

Further, the user device 102 may include an audio capture service 204. The audio capture service 204 may be part of the ride-sharing application 202 or may be separate, but accessible by the ride-sharing application 202. The audio capture service 204 may include any service or application hosted and/or executed by the user device 102 that is capable of capturing speech or other utterances using one or more microphones of the user device 102. In some cases, the utterances may be captured by microphones within the vehicle 120 with which the user device 102 is capable of interfacing.

In some cases, the audio capture service 204 and/or the user devices 102 may have one or more hardware and/or software filters. The filters may be configured to remove ambient noise and utterances that are determined to be generated by non-human users or users not located within the vehicle 120. For example, navigation directions output by the user device 102 or other devices within the vehicle 120 may be filtered from the audio captured by the audio capture service 204. As another example, audio generated by a radio, sounds generated by animals, or utterances spoken by people external to the vehicle 120 may, in some cases, be filtered from audio captured by the audio capture service 204. Utterances may include any speech made by a user. Further, in some cases, utterances may include any sounds or communications made by a user's mouth including both speech and non-speech. For example, the utterances may include sounds of struggle or disgust.

The user devices 102 may communicate with a server 130 via a network 110 to provide captured audio to the server 130, or a harassment detection system 206 of the server 130. The harassment detection system 206 may determine whether audio captured by the audio capture service 204 indicates that a user (e.g., a passenger, a driver, etc.) is being harassed by another user (e.g., a driver, a passenger, etc.) within the vehicle. The harassment detection system 206 can determine whether a user is being harassed by applying audio received from the audio capture service 204 to a prediction model generated by a model generation system 208.

The model generation system 208 may generate a prediction model using one or more machine learning algorithms. The machine learning algorithms may use historical data to generate the prediction model. The historical data may include audio associated with harassment and audio associated with non-harassment utterances. Further, the historical data may include reports, labels, and/or annotations regarding the audio included in the historical data that indicate harassment, types of harassment, level of harassment, and any other information that may facilitate the identification of an occurrence of harassment.

The combination of the audio capture service 204, the ride-sharing application 202, the harassment detection system 206, and the model generation system 208 may form a safety incidence detection system that can be used to identify harassment and to initiate a countermeasure, such as contacting authorities, or blocking a user from using the ride-sharing application 202 or an account on the ride-sharing application 202. Further, in some cases, the location positioning system (e.g., global positioning system or GPS) of the user device 102 may be used to assist authorities in locating a user that is harassing one or more other users.

Example Safety Incidence Detection System

Figure 3:
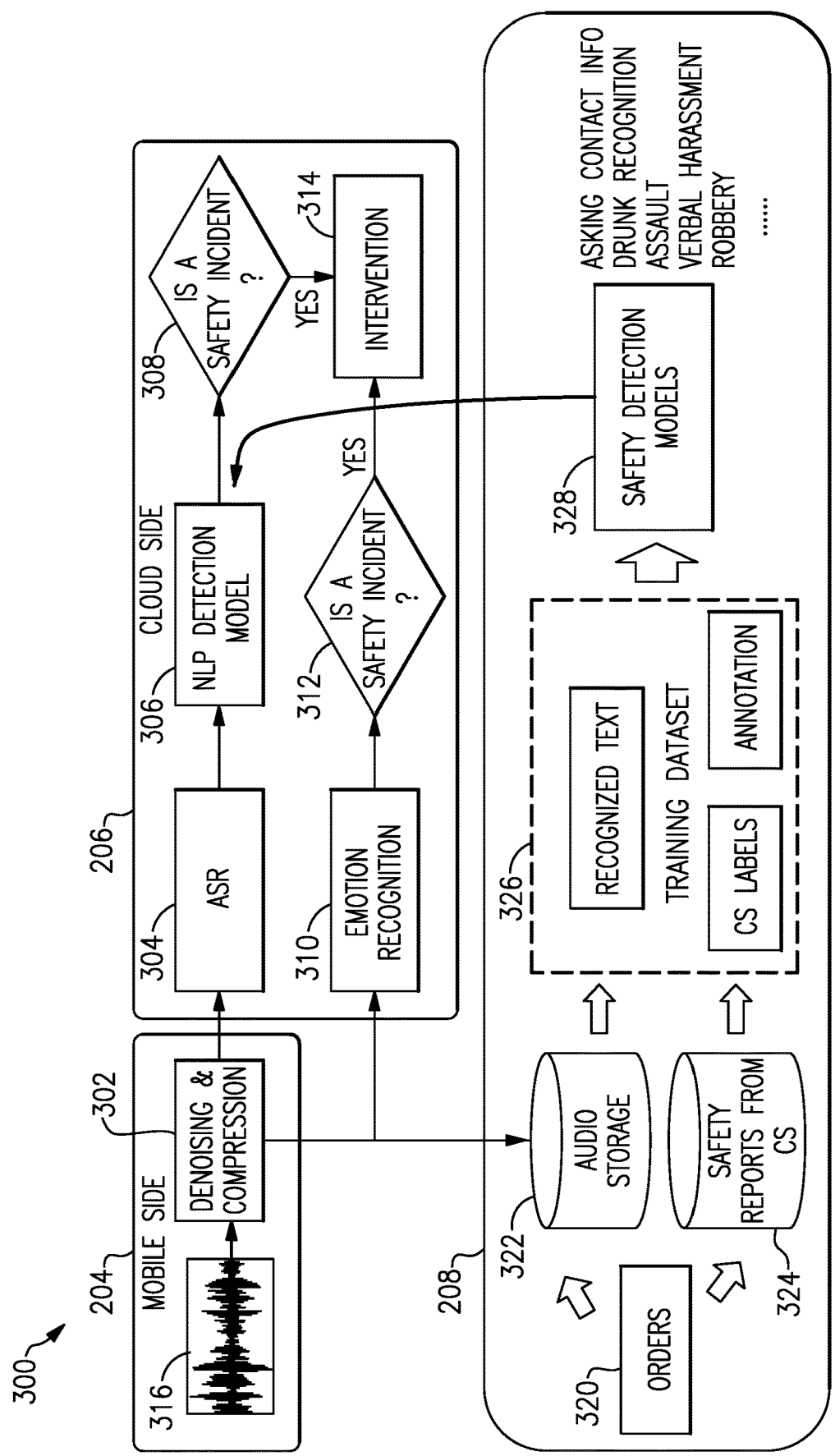
FIG. 3 illustrates a block diagram of a safety incidence detection system in accordance with certain aspects of the present disclosure.

FIG. 3 illustrates a block diagram of operation of a safety incidence detection system 300 in accordance with certain aspects of the present disclosure. As described above, the safety incidence detection system 300 may be formed from a user device 102 (or an audio capture service 204 of the user device 102) and a harassment detection system 206. The user device 102 may be a user device of a ride-sharing driver or a ride-sharing passenger. In some cases, user devices 102 of both drivers and passengers may be included as part of the system 300. Further, the system 300 may include a model generation system 208 that generates one or more prediction models for use by the harassment detection system 206.

The audio capture service 204 of the user device 102 may capture audio 316 or sound within a target area. The audio capture service 204 may be implemented on and/or executed by a driver's device, a passenger's device, or both. The target area is typically, although not limited to, a vehicle 120, or other enclosed space. The captured audio 316 may include utterances from users within the target area, utterances from users within a particular distance of the target area (e.g., a range of a microphone of the user device 102), ambient noise within the vehicle 120 (or in some cases external to the vehicle 120, but within range of a microphone of the user device 102), navigation instructions output by the ride-sharing application 202 or other navigation application, sound from a radio or other audio/visual device operating within the vehicle 120, sounds from non-human animals (e.g., pets) within the vehicle 120, sounds from the vehicle 120, or any other sounds that can be detected by a microphone of the user device 102.

As previously described, the audio capture service 204 may be part of a ride-sharing application 202. Alternatively, the audio capture service 204 may be an independent service or application hosted by the user device 102. In some such cases, the audio capture service 204 may be accessible by the ride-sharing application 202 and/or the server 130. The audio capture service 204 may interact with one or more microphones of the user device 102 to capture audio 316 within the target area. Although many of the embodiments described herein are with respect to the ride-sharing application 202, it should be understood that a separate application from the ride-sharing application 202 may perform the operations described herein with respect to the ride-sharing application 202 for the purposes of harassment detection. For example, a separate application may be installed on one or more user devices 102 to facilitate detection of harassment. The separate application may be required by an entity associated with the ride-sharing application 202 and may interact with the ride-sharing application 202. Alternatively, the separate application may be completely independent of the ride-sharing application 202.

The audio capture service 204 may include one or more filters 302 that can remove noise from the audio captured by the audio capture service 204. Further, in some cases, the filters 302 may include one or more compression systems capable of compressing the captured audio before it is communicated over the network 110 to the harassment detection system 206 at the server 130. Removing the noise may include filtering out non-utterances, removing audio related to navigation, or removing any other audio that can be determined to be from sources other than users within the vehicle 120.

Filtering audio or sounds that are generated from sources other than users within the vehicle 120 can be challenging. The filtering process may include removing frequencies that are not typically generated by users' utterances or removing sounds that are determined to be associated with sources other than users' utterances. Sounds relating to navigation can typically be determined a priori because the ride-sharing application 202, or other navigation application, generates a known output (e.g., audio associated with spoken directions)

based on a known input (e.g., the directions determined by the ride-sharing application 202). Thus, as the output relating to navigation that is output from the ride-sharing application 202 is known, an expected input associated with the navigation instructions may be determined. It should be understood that the actual input associated with the navigation audio received by the microphone of the user device 102 may vary from the expected input due to differences of the layout of each vehicle 120, items within the vehicle 120, positioning of users within the vehicle 120, positioning of the user device 102, and the like. However, as more audio relating to navigation audio is captured over time by the audio capture service 204, the filtering of the navigation audio from the total audio captured by the audio capture service 204 can be improved by using one or more machine learning algorithms to update the expected input for the navigation audio.

Although the filtering is described as being performed by the audio capture service 204, in some cases the filtering may be performed by the harassment detection system 206. Further, in some cases some of the filtering may be performed by the audio capture service 204 and some of the filtering may be performed by the harassment detection system 206. For example, filtering of the navigation audio may be performed on the user device 102 by the audio capture service 204. However, filtering of ambient noise, radio, or other sounds generated by sources other than the users in the vehicle 120 may be performed by the harassment detection system 206. The filters of the audio capture service 204 and/or the harassment detection system 206 may include both hardware-based filters and software-based filters.

In some cases, the audio captured by the audio capture service 204 may be divided into segments. These segments may be time-based or size-based. For example, the audio segments may be divided into 30 second, one minute, five minute, seven minute, or 10 minute segments, or any other time period. Alternatively, or in addition, the audio segments may be divided into files of a particular size, such as 10 MB, 20 MB, 50 MB, 512 MB, 1 GB, etc.

The audio segments, or the filtered audio segments, may be provided to the harassment detection system 206 over a network 110. As previously indicated, in some cases, the harassment detection system 206 may perform filtering or additional filtering. Regardless of whether filtered at the audio capture service 204, the harassment detection system 206, or both systems, the filtered audio may be provided to an automatic speech recognition system 304. The automatic speech recognition system 304 may convert the received audio to text. The automatic speech recognition (ASR) system 304 may include any type of system or algorithm for converting audio to text. For example, the automatic speech recognition system 304 may include using hidden Markov models or deep learning models to convert the speech included in an audio segment to text.

The text generated by the ASR system 304 may be provided to a prediction model 306 to predict whether the text includes utterances indicative of harassment. The prediction model 306 may predict whether the text is harassing, or whether the text indicates harassment, but may or may not be harassment in itself. The prediction model 306 may be a natural language processing model configured to process text to generate a prediction. The prediction output by the prediction model 306 may be a value associated with a likelihood or probability that the text includes utterances indicative of harassment. Based on the prediction output by the prediction model 306, the harassment detection system 206 may determine at the decision block 308 whether harassment, or some other incident associated with the safety of a user, has occurred.

Determining whether harassment has occurred may include comparing the output of the prediction model 306 to a threshold. In some cases, the threshold may vary based on additional factors, such as an emotion detected by an emotion detector or an emotion recognition engine 310. For example, the emotion recognition engine 310 may receive the audio segment from the audio capture service 204. While the prediction model 306 may process text obtained by the ASR system 304 converting the received audio segment, the emotion recognition engine 310 may process the audio segment, filtered or otherwise, directly.

The emotion recognition engine 310 may determine an emotion of the user that generated an utterance included in the audio segment. The emotion of the user may be determined using one or more machine learning models. For example, the emotion of the user may be determined using a support vector machine, a hidden Markov model, or a deep learning model, such as a deep feed-forward and recurrent neural networks, or convolutional neural networks.

Using the emotion of the user determined by the emotion recognition engine 310, the harassment detection system 206 may determine at the decision block 312 whether there is a safety incident or an incidence of harassment. For example, if the emotion recognition engine 310 determines that the user appears to be distressed, frightened, or angry, the harassment detection system 206 may determine that the user is being harassed. If it is determined that either of the decision blocks 308 or 312 indicate a likelihood of harassment, the harassment detection system 206 may initiate a countermeasure or cause an intervention to be performed at the block 314. These countermeasures may include contacting the victim user to confirm a harassment event, contacting an authority (e.g., police) to obtain assistance for the victim user, removing or blocking a perpetrator user from using the ride-sharing application 202, or performing any other intervention action to reduce or prevent further harassment. In some cases, the intervention action 314 may include alerting a user, such as an administrator, of potential harassment. The user may then review the audio segment and confirm whether harassment is occurring before taking or initiating further intervention actions.

In some aspects of the harassment detection system 206, the determination of whether a safety incident, verbal harassment, or other type of harassment is occurring may be based on a combination of the prediction output by the prediction model 306 and the emotion detected by the emotion recognition engine 310. By combining the detected emotion with the output of the prediction model, it is possible to distinguish between a user who may be feeling harassed by a particular utterance and a user who may not be feeling harassed by the particular utterance. For example, a driver asking a passenger for personal contact information is typically inappropriate and may lead passenger to feel harassed. However, it is possible in some cases that the passenger and the driver may have previously known each other and lost contact over time. In such cases, the driver asking the passenger for personal contact information may not be harassment, but may be an effort for two prior acquaintances to become reconnected. These two use cases may be distinguished based on the emotion of the user making the utterance or responding to the utterance. Accordingly, in some cases, the use of emotion detection in combination with the harassment prediction enables improved detection of verbal harassment.

In some aspects of the harassment detection system 206, the emotion detected by the emotion recognition engine 310 may be provided to the prediction model 306 as an additional input to the prediction model 306. Based on the detected emotion and the text obtained by the ASR system 304, the prediction model 306 may determine a likelihood or probability that a user is being harassed.

The prediction model 306 used by the harassment detection system 206 may be generated by a model generation system 208. The model generation system 208 may use one or more machine learning algorithms to generate the prediction model based on a set of training data 326. This training data 326 may be obtained from different sources of historical data. The historical data may be obtained from real-world incidents. For example, the audio segments captured by the audio capture service 204 in addition to being provided to the harassment detection system 206 may be provided to the model generation system 208 to facilitate generating the prediction models that are applied at the block 306.

The historical data may include a set of orders 320. Each order 320 may be associated with a ride-sharing event; for example, the pickup and drop-off of a user and a destination requested by the user via the ride-sharing application 202. Further, the order 320 may be associated with a safety report generated by a user (e.g., an administrator or customer service representative) or generated automatically in response to data entered by a user (e.g., a driver or passenger) into the ride-sharing application 202 or other interface made available by an entity associated with the ride-sharing application 202 for lodging a complaint or reporting on a harassment or safety incident. In some cases, each order within the orders 320 is associated with a safety report regardless of whether a harassment incident occurred. In cases where a harassment or safety incident did not occur, the safety report may indicate the lack of a harassment or safety incident. In other cases, only orders within the orders 320 where a harassment or safety incident occurred may be associated with a customer safety report. In some such cases, each order 320 may indicate whether a safety report exists or not. The safety report for each order 320 and/or the indication of an existence of a safety report for each order 320 may be stored at a safety report repository 324. Further, audio segments associated with each order 320 may be stored at an audio storage repository 322. The audio segments associated with a particular order 320 stored in the audio storage repository 322 may be linked to or otherwise have an indicator identifying any associated safety reports from the safety report repository 324. In some cases, the repository 322 and 324 may be combined into a single repository.

The data (e.g., the one or more audio segments, the safety reports, and/or the indication of an existence or lack thereof of a safety report) associated with each order 320 may form the training dataset 326 that can be applied to a machine learning algorithm to generate one or more safety detection models 328. In some cases, the training dataset 326 may include annotation data in addition to labels supplied by users (e.g., administrators or customer service employees). The customer service labels and the annotation data may be generated by two different users. The customer service labels may be generated by a user configured to collect and index the customer service complaints. The annotation data may be generated by harassment experts that are trained to detect harassment based on audio and/or written reports. The machine learning algorithms used to generate the prediction models may use supervised learning techniques. By having multiple viewers reviewing harassment complaints, and labelling and/or annotating the customer service complaint reports, the performance of the supervised learning techniques can be improved. Additional embodiments relating to the generation or formation of the training data that may be used herein with respect to generating the training dataset 326 are disclosed in the Training Applications previously incorporated by reference in this application. Further, additional embodiments relating to the training of harassment detection systems are disclosed in the Training Applications previously incorporated by reference in this application.

Figure 4:
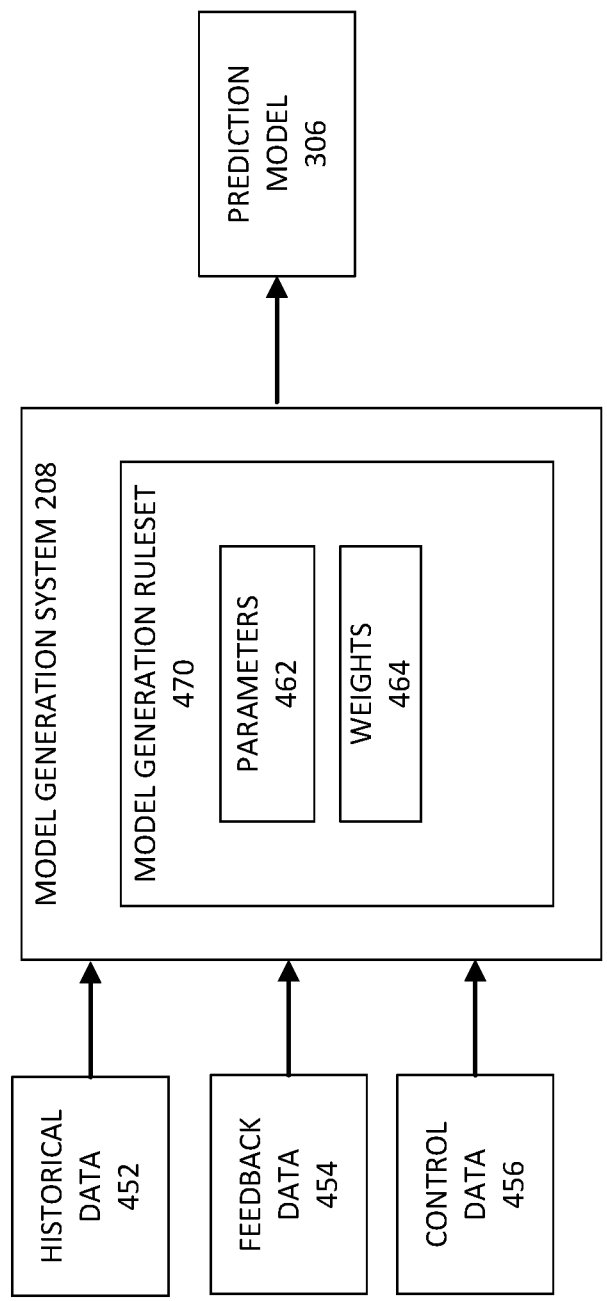
FIG. 4 illustrates a block diagram of a model generation system in accordance with certain aspects of the present disclosure.

The one or more safety detection models 328 may be used as the prediction models 306 used by the harassment detection system 206 to predict whether an audio segment received from the audio capture service 204 of the user device 102 indicates harassment or other illegal or undesirable activity (e.g., verbal harassment, sexual harassment, drunk driving, robbery, requesting passenger personal information, etc.) detectable by user utterances or sound. One non-limiting example of the model generation system 208 that can generate the prediction model 306 is illustrated in FIG. 4.

As previously described, the captured audio 316 may be obtained by an audio capture service 204 implemented on a user device 102. This user device 102 may be a passenger's device or a driver's device. Regardless of whose device, the driver and the user that ordered the ride may be associated with each other based on a shared identifier that may be generated for a ride-sharing event by a ride-sharing application 202. Alternatively, each user may have separate identifiers which may be associated with each other for a ride-sharing event based on the passenger's request for a ride and the driver being assigned or accepting the ride. When a connection is made between the user requesting the ride and the user providing the ride within the ride-sharing application 202, identifiers associated with the driver and passenger may be associated with each other, at least for the ride-sharing event. Thus, if a harassment event occurs, it is possible to identify the driver and user that requested the ride who were involved in the harassment event.

In some cases, the harasser or victim may be neither the driver nor the user that requested the ride via the ride-sharing application 202. For example, the harasser or victim may be another passenger, someone who approaches the ride-share vehicle, or someone who approaches the ride-share user as they are waiting for the ride. However, by identifying the driver and the ride-requesting user, it may be possible to assist the victim or identify the harasser through an intervention action (e.g., notifying authorities or providing a location of the vehicle containing the victim or harasser to authorities during the ride-sharing event).

Example Model Generation System

FIG. 4 illustrates a block diagram of a model generation system 208 in accordance with certain aspects of the present disclosure. The model generation system 208 may be used to determine one or more prediction models 306 based on historical data 452 for a number of orders 320 or ride-sharing events. Typically, although not necessarily, the historical data 452 includes data associated with a large number of orders 320 or ride-sharing events, such as hundreds, thousands, hundreds of thousands, or more orders. However, the present disclosure is not limited as such, and the number of ride-sharing events or orders may include any number. These orders may each be associated with unique ride-sharing events or drives and/or unique users. Alternatively, at least some of the orders may be associated with the same drive and/or the same user or set of users. For example, some users may request multiple ride-sharing drives over time. Further, drivers may be associated with one order or multiple orders.

The historical data 452 can include data received from one or more data sources, such as, for example one or more audio capture services 204, customer service users, customer service systems, and/or user devices 102. Further, the historical data 452 can include data from different data sources, different data types, and any data generated based on audio captured by the audio capture service 204 during one or more orders and/or one or more safety reports generated by a customer service representative or customer service system of an entity associated with the ride-sharing application 202. The historical data may generally include sets of real-world audio data and/or safety incident reports. Further, the historical data 452 may include harassment labels or ratings for the captured audio or audio segments obtained from the captured audio.

In some aspects, the historical data 452 may include a very large number of data points, such as millions of data points, which may be aggregated into one or more data sets. In some cases, the historical data 452 may be accessed from an audio storage repository 322 or a safety report repository 324. Further, in some instances, one or more subsets of the historical data 452 may be limited by a date restriction, such as, for example, limited to include only data from the last 6 months, data that is between 3-6 months old, or data less than a year old. Changing language and culture can cause words to obtain new meanings. These new meanings may result in certain word-usages that might not have been harassing to become associated with harassment. Limiting the training data to a particular time period may facilitate generating a prediction model 306 that reflects changes in the use of certain language over time.

The model generation system 208 may, in some cases, also receive feedback data 454. This data may be received as part of a supervised model generation process that enables a user, such as an administrator, to provide additional input to the model generation system 208 that may be used to facilitate generation of the prediction model 306. For example, if an anomaly exists in the historical data 452, the user may tag the anomalous data enabling the model generation system 208 to handle the tagged data differently, such as by applying a different weight to the data or excluding the data from the model generation process.

Further, the model generation system 208 may receive control data 456. This control data 456 may identify one or more features or characteristics for which the model generation system 208 is to determine a model. Further, in some cases, the control data 456 may indicate a value for the one or more features identified in the control data 456. For example, suppose the control data 456 indicates that a prediction model is to be generated using the historical data 452 to determine whether audio data indicates a user is being verbally harassed. If it is known whether the audio data is sexually suggestive, uses foul language, is threatening, or requests sexual favors, the control data 456 may include data or labels indicating such classifications as part of the historical data 452 for the audio data.

The model generation system 208 may generally include a model generation rule set 470 for generation of the prediction model 306. The rule set 470 may include one or more parameters 462. Each set of parameters 462 may be combined using one or more mathematical functions to obtain a parameter function or prediction model 306. Further, one or more specific parameters may be weighted by the weights 464. In some cases, the parameter function or prediction model 306 may be obtained by combining a set of parameters with a respective set of weights 464. The prediction model 306 and/or the respective parameters 462 of the prediction models 306 may be derived during a training process based on particular input data, such as the historical data 452, the feedback data 454, and the control data 456, and defined output criteria, which may be included with the control data 456, used for training purposes. The model generation rule set 470 can define the specific machine learning rules and/or algorithms the model generation system 208 uses to generate the model based on a defined objective function, such as determining whether a user feels verbally harassed. In some instances, initial parameters 462 and weights 464 can be manually provided during the initiation of the model generation process. The parameters 462 and weights 464 can be updated and modified during the model generation phase to generate the prediction model 306.

In some cases, the model generation ruleset 470 can indicate the type of machine learning algorithms to perform on the historical data 452. For example, the model generation ruleset 470 may indicate that the model generation system 208 use a FastText algorithm, a convolutional neural network (CNN), or a hierarchical attention network (HAN) to generate the prediction model 306.

The model generation system 208 can filter and categorize the historical data 452 according to various characteristics and parameters of the data. For example, the data can be categorized by the data source (such as, for example, audio from a driver, audio from a passenger, or mixed audio), whether there is identified harassment occurring in the audio, whether other audio from the same order 320 indicates harassment, the type of harassment identified, or other categories associated with the data. The model generation system 208 can filter the information to identify subset of historical data 452 for further processing. In some embodiments, the model generation system 208 is configured to filter and separate the historical data 452 into a plurality of data types or categories before further processing. Moreover, in some cases, some of the historical data 452 may be filtered out or removed from the historical data 452 based on the data being associated with a relevance that does not satisfy a threshold relevance as determined by the model generation system 208. For example, an audio segment that is primarily silence, primarily navigation directions, or is mainly animal (e.g., from pets) sounds may be removed from the historical data 452.

After the prediction model 306 has been generated, the model can be deployed or used during runtime of the harassment detection system 206 to determine or predict whether a user is being harassed by another user during a ride-sharing event. In some instances, the prediction model 306 generated based at least on the historical data 452 may be provided as an input to the model generation system 208. The prediction model 306 may then be modified based on additional training data received including, in some cases, more recent ride-sharing events than those initially used as part of the historical data 452 to initially generate the prediction model 306. In other words, in some cases, the prediction model 306 can be modified or updated over time as more data and/or audio segments are obtained.

Example Machine Learning Based Harassment Detection System

Figure 5:
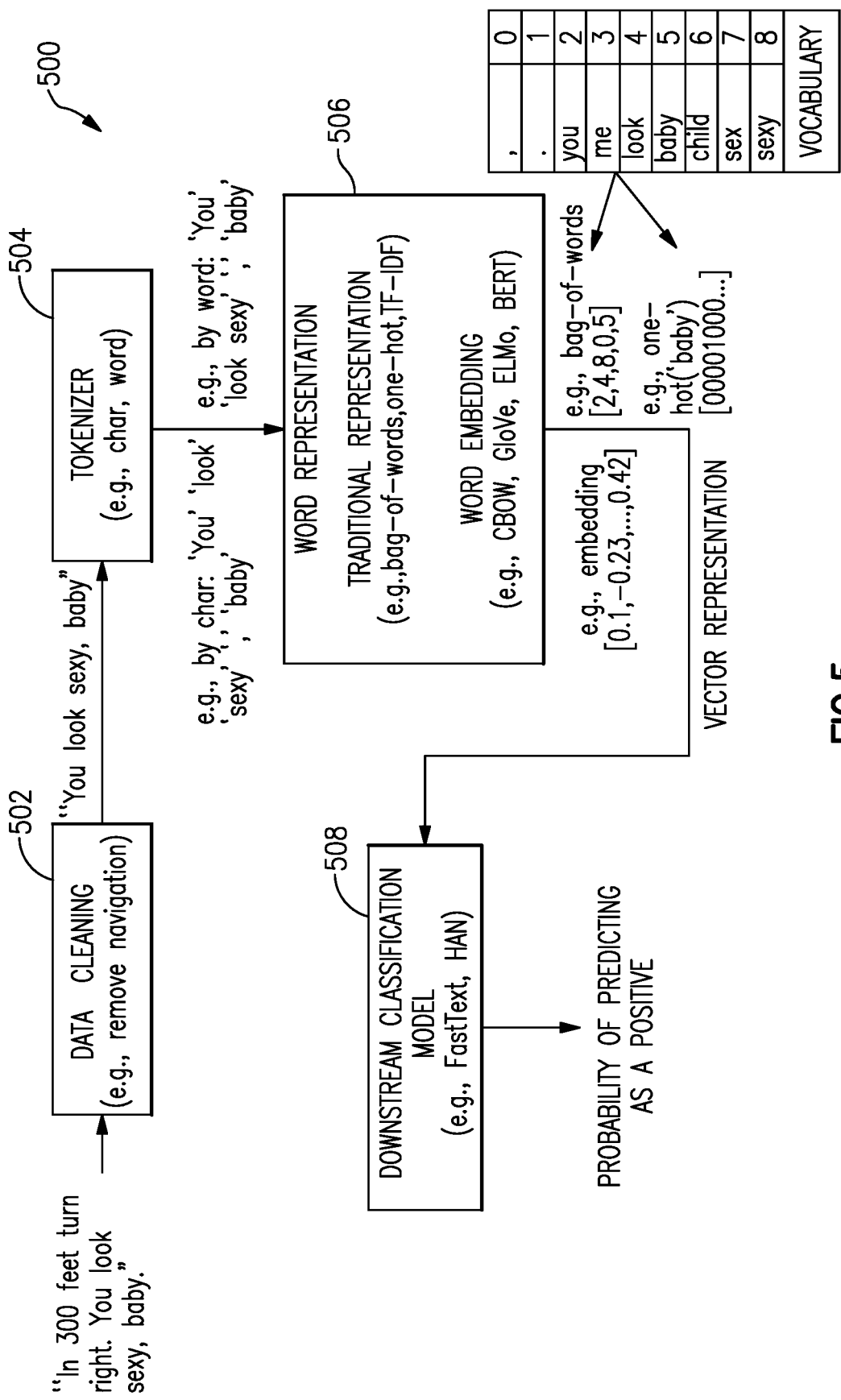
FIG. 5 illustrates a block diagram of a machine learning based harassment detection system in accordance with certain aspects of the present disclosure.

FIG. 5 illustrates a block diagram of a machine learning based harassment detection process 500 in accordance with certain aspects of the present disclosure. The harassment detection system 206 may implement elements of the process 500 by at least applying the prediction model 306 to the text output by the ASR system 304.

The harassment detection system 206 may implement the process 500 after the ASR system 304 performs an ASR process to convert received audio segments to text. The output of the process 500 may be provided to the harassment detection system 206 to determine at the decision block 308 of FIG. 3 whether a harassment event has occurred.

FIG. 5 illustrates an example use case where a driver has made some explicit comments to a passenger. This comment may be recorded by a microphone of the user device 102 and provided to the audio capture service 204. The audio capture service 204 or the ride-sharing application 202 may divide the audio into audio segments of a particular length (e.g., 5 minute segments) and provide the audio segments to the harassment detection system 206. The harassment detection system 206 converts the audio segment to text using the ASR system 304. In the particular example of FIG. 5, the text ("In 300 feet turn right. You look sexy, baby.") includes both speech from a ride-sharing driver and audio that was output by a navigation system (e.g., a navigation feature of the ride-sharing application 202).

The harassment detection system 206 may use one or more filters at block 502 to remove non-user speech and other ambient sounds. Thus, the navigation related text generated from the audio of the navigation system may be removed from the text. Continuing the example of the previous paragraph, after performing the filtering, the text remaining will be "You look sexy, baby." The filters applied at the block 502 may include a set of filters with each filter designed to remove particular types of noise or data. For example, one filter may be used to clean vehicle-related noises, one filter may be used to remove navigation-related audio generated by a navigation system, and one filter may be used to remove pet noise.

At block 504, the harassment detection system 206 uses a tokenization process to break the filtered text into words or characters. The tokenization process can include performing one or more natural language processing algorithms or applying the text to one or more natural language processing models to identify words and characters within the text. Non-limiting examples of machine learning models that can be used to identify words and/or characters includes bag-of-words, one-hot, term frequency-inverse document frequency (tf-idf) modeling, continuous bag of words (CBOW), Global Vectors (GloVe) modeling, ELMo modeling, and Bidirectional Encoder Representations from Transformers (BERT) modeling.

The result of the tokenization process may vary depending on the selected tokenization algorithm. The output may include a vector representation that may identify a position of words in the text, a count of a number of occurrences of a word, a relative positioning of words with respect to other words, and the like. Continuing the previous example, the tokenization process may break the filtered text down to the individual words "you", "look", "sexy", and "baby." These words may then be associated with values in a vector indicating the words themselves, the position of the words, and/or the frequency of occurrence of the words. Further, a semantic analysis of the text may be performed to determine the structure of the text, and the relation between words and clauses within the text.

The resultant vector representation of the words generated by the tokenizer may be applied to the prediction model generated by the model generation system 208 at block 508. As previously described, the generated prediction model may be a FastText model, a hierarchical Attention Network (HAN) based model, or any other type of model that may be generated using a machine learning process to predict whether a segment of text obtained from a segment of audio is indicative of a harassment event.

The output of the prediction model 306 applied at the block 508 may be a prediction of whether the text segment corresponding to the audio segment is harassing or associated with harassment. Alternatively, the output may be a probability of likelihood that the text segment includes harassing text. This probability may be compared to a threshold to determine whether the text is harassing and/or whether an intervention should be performed to stop or prevent future occurrences of the harassing behavior.

Experimental Results

FIG. 6 presents a table of sample data applied to an embodiment of the safety incidence detection system 300. During the experiments, a word2vec embedding technique was used to reconstruct tokens to capture the linguistic contexts of words or sentences. The down-streaming text classification model was used for a prediction function. FIG. 6 provides ASR recognized text datasets used to train, validate, and test the HAN prediction model 306. The positive examples refer to examples with harassment and the negative refers to examples without harassment. The L4 cases refer to a subset of cases that include significant sexual harassment and are also included in the positive samples. The L4 cases may include cases of clear sexual harassment (e.g., propositioning a passenger or using explicit language) as opposed to cases that may require additional information or context (e.g., words that may have multiple meanings or that are slang) to determine whether sexual harassment is occurring.

Figure 7:
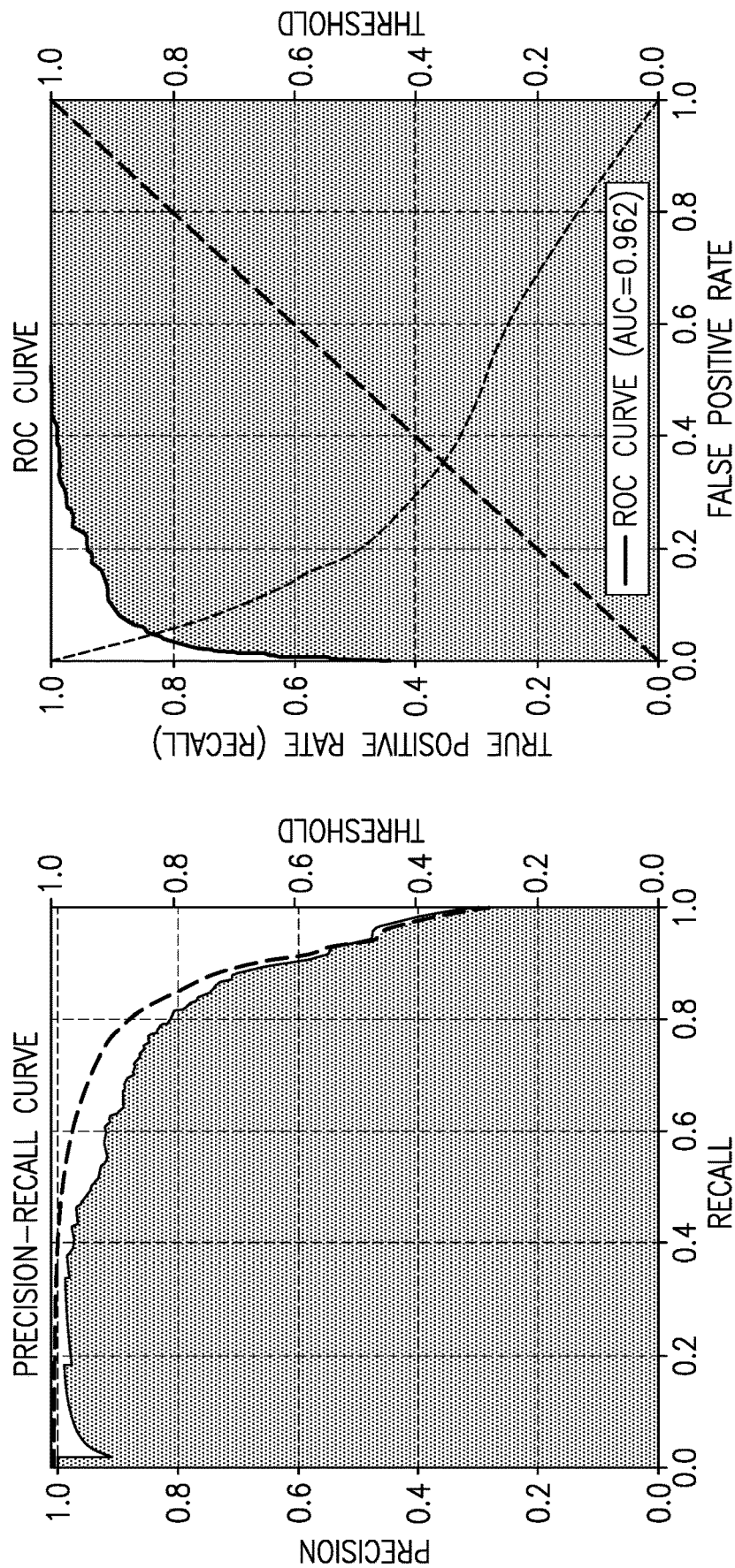
FIG. 7 illustrates a pair of graphs illustrating experimental results for a set of experiments performed using the sample data of FIG. 6 as applied to an embodiment of the safety incidence detection system.

FIG. 7 illustrates a pair of graphs illustrating experimental results for a set of experiments performed using the sample data of FIG. 6 as applied to an embodiment of the safety incidence detection system 300. The graphs in FIG. 7 present an order-level precision-recall curve and a receiver operating characteristic (ROC) curve.

FIG. 8 presents experimental results for case recalls at different thresholds using the sample data of FIG. 6 an embodiment of the safety incidence detection system. The case recalls are for the L4 cases that include more serious levels of sexual harassment.

FIG. 9 presents experimental results for order-level influence rates at different thresholds using the sample data of FIG. 6 as applied to an embodiment of the safety incidence detection system 300. The influence rate may include the percentage of orders (e.g., ride-sharing orders or events) that the prediction model predicts as positives (e.g., occurrence of harassment) among all the orders. The lower the influence rate the better. In the experiments, the evaluated dataset (~100,000 orders) was randomly selected from all the orders from three cities during one day.

From the results (see FIGS. 7-9) of the performed experiments, it can be seen that the HAN prediction model trained with ASR recognized texts from in-car audios can recall 56.8% of L4 cases and reach 0.922 precision, with 0.579 recall for the test data at the influence rate 1.4% (i.e., threshold is 0.97). These experimental test results significantly outperform some existing pattern-based methods (even at an influence rate of 14.75%, the precision is only 0.415 and recall is 0.520). In some cases, the developed HAN model can be user over a network to detect verbal harassment incidents in real time instead of waiting to receive customer complaints, which may be delayed or not received in some cases.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation. For example, in some cases, at least some of the audio filtering may be performed by the audio capture service 204 and/or the harassment detection system 206.

Example Embodiments

Some example enumerated embodiments are recited in this section in the form of methods, systems, and non-transitory computer-readable media, without limitation.

In certain aspects, a computer-implemented method may determine or predict whether a user is being harassed. The method may be implemented by an interactive computing system comprising one or more hardware processors that are configured with or to perform specific computer-executable instructions. The method may include: receiving an audio segment comprising a portion of audio captured by a microphone located within a vehicle; converting the audio segment to a text segment; accessing a prediction model associated with verbal harassment detection; providing at least the text segment to the prediction model to obtain a harassment prediction; providing the audio segment to an emotion detector to obtain a detected emotion of a speaking user that made an utterance included in the audio segment; and determining based at least in part on the harassment prediction and the detected emotion that a user is being harassed.

The method of the preceding paragraph can include any combination or sub-combination of the following features: where the prediction model comprises at least one of a hierarchical attention network model, a fastText model, or a convolutional neural network model; where the emotion detector implements one or more of a hidden Markov model, a support vector machine, a deep feed-forward model, a recurrent neural network, or a convolutional neural network; where the method further comprises initiating an intervention process upon determining that the user is being harassed; where initiating the intervention process comprises one or more of: alerting an authority; alerting an administrator of a ride-sharing application; causing an alert to be displayed on a wireless device located within the vehicle; or blocking a driver user from accepting an order on the ride-sharing application; where the microphone is included on a wireless device executing a ride-sharing application; where the audio segment comprises a filtered audio segment that is filtered to remove audio not generated by occupants of the vehicle; where the filtered audio segment is filtered to remove one or more of navigation audio, radio audio, ambient sounds from outside the vehicle, or ambient sounds generated by the vehicle during operation; where the method further comprises generating the prediction model that determines a likelihood of harassment of a first user by a second user, wherein generating the prediction model comprises: accessing a set of training data comprising text generated from a set of audio segments, wherein at least some of the set of training data includes verbal harassment and at least some of the set of training data does not include verbal harassment; accessing a set of harassment labels associated with the set of training data, the set of harassment labels identifying an existence of or a type of harassment associated with each training data item; and using a machine learning algorithm to generate the prediction model based at least in part on the set of training data and the set of harassment labels; where the set of training data comprises historical audio segments obtained during prior orders generated on a ride-sharing application; where the method further comprises generating a vector representation of the text segment, wherein providing the text segment to the prediction model comprises providing the vector representation of the text segment to the prediction model; where determining that the user is being harassed comprises determining that at least one of a harassment prediction probability satisfies a first harassment probability threshold or a measure of the detected emotion exceeds a second harassment probability threshold; where determining that the user is being harassed comprises determining that an aggregation of a harassment prediction probability and a measure of the detected emotion exceeds a third harassment probability threshold; where converting the audio segment to the text segment comprises applying the audio segment to a hidden Markov model or a deep learning model; and where the speaking user is one of the user being harassed or a user performing the harassment.

In some aspects, a system configured to predict an occurrence of harassment of a user of a ride-sharing application is disclosed. The system may include a non-volatile storage configured to store one or more prediction models useable to predict the occurrence of the harassment of the user and a hardware processor of an interactive computing system in communication with the non-volatile storage. The hardware processor may be configured to execute specific computer-executable instructions to at least: receive an audio segment comprising a portion of audio captured by a microphone located within a vehicle; convert the audio segment to a text segment; access a prediction model associated with verbal harassment detection from the non-volatile storage; provide at least the text segment to the prediction model to obtain a harassment prediction; provide the audio segment to an emotion detector to obtain a detected emotion of a speaking user that made an utterance included in the audio segment; and determine based at least in part on the harassment prediction and the detected emotion that the user is being harassed.

The system of the preceding paragraph can include any combination or sub-combination of the following features: where the hardware processor is further configured to execute specific computer-executable instructions to at least initiate an intervention process upon determining that the user is being harassed, wherein initiating the intervention process comprises one or more of: alerting an authority; alerting an administrator of the ride-sharing application; causing an alert to be displayed on a wireless device located within the vehicle; or blocking a driver user from accepting an order on the ride-sharing application; where the hardware processor is further configured to execute specific computer-executable instructions to at least generate the prediction model that determines a likelihood of harassment of a first user by a second user, wherein generating the prediction model comprises: accessing a set of training data comprising text generated from a set of audio segments, wherein at least some of the set of training data includes verbal harassment and at least some of the set of training data does not include verbal harassment; accessing a set of harassment labels associated with the set of training data, the set of harassment labels identifying an existence of or a type of harassment associated with each training data item; and using a machine learning algorithm to generate the prediction model based at least in part on the set of training data and the set of harassment labels; where the hardware processor is further configured to execute specific computer-executable instructions to at least generate a vector representation of the text segment, wherein the hardware processor is further configured to provide the text segment to the prediction model by providing the vector representation of the text segment to the prediction model; and where determining that the user is being harassed comprises determining that at least one of a harassment prediction probability satisfies a first harassment probability threshold or a measure of the detected emotion exceeds a second harassment probability threshold.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims.

To reduce the number of claims, certain aspects are presented below in certain claim forms, but the applicant contemplates other aspects in any number of claim forms. For example, while only one aspect may be recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method of predicting an occurrence of harassment of a user of a ride-sharing application, the computer-implemented method comprising:

as implemented by an interactive computing system comprising one or more hardware processors and configured with specific computer-executable instructions,
generating a prediction model that determines a likelihood of harassment of a first user by a second user, wherein generating the prediction model comprises:
accessing a set of training data comprising text generated from a set of audio segments, wherein at least some of the set of training data includes verbal harassment and at least some of the set of training data does not include verbal harassment;
accessing a set of harassment labels associated with the set of training data, the set of harassment labels identifying an existence of or a type of harassment associated with each training data item; and
using a machine learning algorithm to generate the prediction model based at least in part on the set of training data and the set of harassment labels;
receiving an audio segment comprising a portion of audio captured by a microphone located within a vehicle providing a ride to a user of a ride-sharing application associated with a ride-sharing service;
converting the audio segment to a text segment;
accessing the prediction model associated with verbal harassment detection;
providing at least the text segment to the prediction model to obtain a harassment prediction;
providing the audio segment to an emotion detector to obtain a detected emotion of a speaking user that made an utterance included in the audio segment; and
determining based at least in part on the harassment prediction and the detected emotion that the user is being harassed, wherein one or more of the harassment prediction and the detected emotion corresponds to a probability satisfying a probability threshold.

2. The computer-implemented method of claim 1, wherein the prediction model comprises at least one of a hierarchical attention network model, a fastText model, or a convolutional neural network model.

3. The computer-implemented method of claim 1, wherein the emotion detector implements one or more of a hidden Markov model, a support vector machine, a deep feed-forward model, a recurrent neural network, or a convolutional neural network.

4. The computer-implemented method of claim 1, further comprising initiating an intervention process upon determining that the user is being harassed.

5. The computer-implemented method of claim 4, wherein initiating the intervention process comprises one or more of: alerting an authority; alerting an administrator of the ride-sharing application; causing an alert to be displayed on a wireless device located within the vehicle; or blocking a driver user from accepting an order on the ride-sharing application.

6. The computer-implemented method of claim 1, wherein the microphone is included on a wireless device executing the ride-sharing application.

7. The computer-implemented method of claim 1, wherein the audio segment comprises a filtered audio segment that is filtered to remove audio not generated by occupants of the vehicle.

8. The computer-implemented method of claim 7, wherein the filtered audio segment is filtered to remove one or more of navigation audio, radio audio, ambient sounds from outside the vehicle, or ambient sounds generated by the vehicle during operation.

9. The computer-implemented method of claim 1, wherein the set of training data comprises historical audio segments obtained during prior orders generated on a ride-sharing application.

10. The computer-implemented method of claim 1, further comprising generating a vector representation of the text segment, wherein providing the text segment to the prediction model comprises providing the vector representation of the text segment to the prediction model.

11. The computer-implemented method of claim 1, wherein determining that the user is being harassed comprises determining that at least one of a harassment prediction probability satisfies a first harassment probability threshold or a measure of the detected emotion exceeds a second harassment probability threshold.

12. The computer-implemented method of claim 1, wherein determining that the user is being harassed comprises determining that an aggregation of a harassment prediction probability and a measure of the detected emotion exceeds a third harassment probability threshold.

13. The computer-implemented method of claim 1, wherein converting the audio segment to the text segment comprises applying the audio segment to a hidden Markov model or a deep learning model.

14. The computer-implemented method of claim 1, wherein the speaking user is one of the user being harassed or a user performing the harassment.

15. A system configured to predict an occurrence of harassment of a user of a ride-sharing application, the system comprising:
a non-volatile storage configured to store one or more prediction models useable to predict the occurrence of the harassment of the user; and
a hardware processor of an interactive computing system in communication with the non-volatile storage, the hardware processor configured to execute specific computer-executable instructions to at least:
generate a prediction model that determines a likelihood of harassment of a first user by a second user, wherein generating the prediction model comprises:
accessing a set of training data comprising text generated from a set of audio segments, wherein at least some of the set of training data includes verbal harassment and at least some of the set of training data does not include verbal harassment;
accessing a set of harassment labels associated with the set of training data, the set of harassment labels identifying an existence of or a type of harassment associated with each training data item; and
using a machine learning algorithm to generate the prediction model based at least in part on the set of training data and the set of harassment labels;
receive an audio segment comprising a portion of audio captured by a microphone located within a vehicle;
convert the audio segment to a text segment;
access the prediction model associated with verbal harassment detection from the non-volatile storage;
provide at least the text segment to the prediction model to obtain a harassment prediction;
provide the audio segment to an emotion detector to obtain a detected emotion of a speaking user that made an utterance included in the audio segment; and
determine based at least in part on the harassment prediction and the detected emotion that the user is being harassed, wherein one or more of the harassment prediction and the detected emotion corresponds to a probability satisfying a probability threshold.

16. The system of claim 15, wherein the hardware processor is further configured to execute specific computer-executable instructions to at least initiate an intervention process upon determining that the user is being harassed, wherein initiating the intervention process comprises one or more of: alerting an authority; alerting an administrator of the ride-sharing application; causing an alert to be displayed on a wireless device located within the vehicle; or blocking a driver user from accepting an order on the ride-sharing application.

17. The system of claim 15, wherein the hardware processor is further configured to execute specific computer-executable instructions to at least generate a vector representation of the text segment, wherein the hardware processor is further configured to provide the text segment to the prediction model by providing the vector representation of the text segment to the prediction model.

18. The system of claim 15, wherein determining that the user is being harassed comprises determining that at least one of a harassment prediction probability satisfies a first harassment probability threshold or a measure of the detected emotion exceeds a second harassment probability threshold.

19. The system of claim 15, wherein determining that the user is being harassed comprises determining that an aggregation of a harassment prediction probability and a measure of the detected emotion exceeds a third harassment probability threshold.

20. The system of claim 15, wherein converting the audio segment to the text segment comprises applying the audio segment to a hidden Markov model or a deep learning model.

* * * * *